US009689684B2

(12) United States Patent
Sheard et al.

(10) Patent No.: US 9,689,684 B2
(45) Date of Patent: Jun. 27, 2017

(54) INERTIAL NAVIGATION SYSTEM

(71) Applicant: Atlantic Inertial Systems Limited, Plymouth (GB)

(72) Inventors: John Keith Sheard, Plymouth (GB); Nicholas Mark Faulkner, Plymouth (GB)

(73) Assignee: ATLANTIC INERTIAL SYSTEMS, LIMITED., Plymouth, Devon (GB)

( * ) Notice: Subject to any disclaimer, the term of this patent is extended or adjusted under 35 U.S.C. 154(b) by 0 days.

(21) Appl. No.: 15/121,854

(22) PCT Filed: Feb. 16, 2015

(86) PCT No.: PCT/GB2015/050439
§ 371 (c)(1),
(2) Date: Aug. 26, 2016

(87) PCT Pub. No.: WO2015/128610
PCT Pub. Date: Sep. 3, 2015

(65) Prior Publication Data
US 2017/0016728 A1    Jan. 19, 2017

(30) Foreign Application Priority Data
Feb. 27, 2014 (GB) .................................. 1403426.8

(51) Int. Cl.
*G01C 21/16* (2006.01)
*G01C 19/02* (2006.01)
(Continued)

(52) U.S. Cl.
CPC ............... *G01C 21/16* (2013.01); *F41G 7/36* (2013.01); *G01C 19/025* (2013.01); *G05D 1/10* (2013.01)

(58) Field of Classification Search
None
See application file for complete search history.

(56) References Cited

U.S. PATENT DOCUMENTS 6,163,021 A * 12/2000 Mickelson ............... F41G 7/305
                                                   244/164
6,208,936 B1 * 3/2001 Minor .................. G01C 21/165
                                                   244/171
8,047,070 B2   11/2011 Tyree

OTHER PUBLICATIONS

Bekkeng J K: "Calibration of a Novel MEMS Inertial Reference Unit", IEEE Transactions on Instrumentation and Measurement, IEEE Service Center, Piscataway, NJ, US, vol. 58, No. 6, Jun. 1, 2009 (Jun. 1, 2009). pp. 1967-1974.
(Continued)

*Primary Examiner* — Russell Frejd
(74) *Attorney, Agent, or Firm* — Cantor Colburn LLP

(57) ABSTRACT

An inertial measurement system for a longitudinal projectile comprising: a first, roll gyro to be oriented substantially parallel to the longitudinal axis of the projectile; a second gyro and a third gyro with axes arranged with respect to the roll gyro such that they define a three dimensional coordinate system; a controller, arranged to: compute a current projectile attitude from the outputs of the first, second and third gyros, the computed attitude comprising a roll angle, a pitch angle and a yaw angle; compare the computed pitch and yaw angles with expected values for the pitch and yaw angles; calculate a roll angle error and a roll scale factor error based on the difference between the computed pitch and yaw angles and the expected pitch and yaw angles; and apply the calculated roll angle error and roll scale factor error to the output of the roll gyro.

15 Claims, 2 Drawing Sheets

(51) Int. Cl.
   *F41G 7/36*    (2006.01)
   *G05D 1/10*    (2006.01)

(56)          References Cited

OTHER PUBLICATIONS

J.S. Bird, "Inertial Sensor Performance Requirements for a Long Range Artillery Rocket" (DTIC ADA279936); Apr. 1993; pp. 1-21.
Jonathan Rogers et al: "Roll Orientation Estimator for Smart Projectiles Using Thermopile Sensors", Journal of Guidance, Control, and Dynamics, vol. 34, No. 3, May 1, 2011 (May 1, 2011), pp. 688-697.
Luisa D. Fairfax et al: "Position Estimation for Projectiles Using Low-Cost Sensors and Flight Dynamics", Journal of Aerospace Engineering, vol. 27, No. 3, Apr. 1, 2012 (Apr. 1, 2012), pp. 611-620.
M.J. Wilson, "Attitude Determination with Magnetometers for un-Launched Munitions", DTIC ADA425992; Aug. 2004; pp. 1-23.
Notification of Transmittal of the International Search Report and the Written Opinion of the International Searching Authority, or the Declaration; PCT/GB2015/050439; Jul. 21, 2015 , pp. 1-10,
Savage P G: "Strapdown System Algorithms", Advances in Spradown Inertial Systems, Jan. 1, 1984 (Jan. 1, 1984), pp. 3.01-3.30.
T.E. Harkins, "On the Viability of Magnetometer-Based Projectile Orientation Measurements", DTIC ADA474475; Nov. 2007; pp. 1-35.

\* cited by examiner

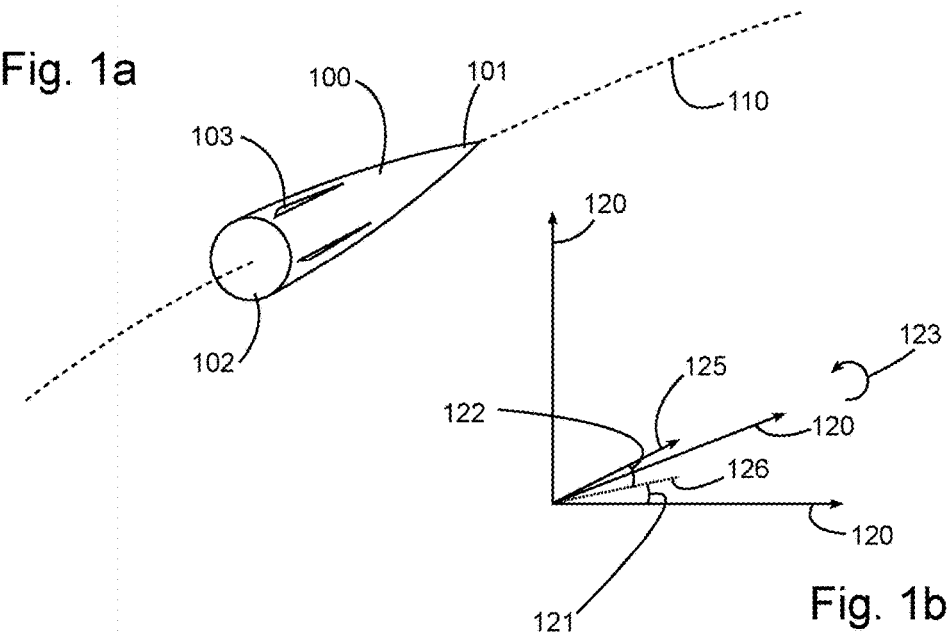
Fig. 1a
Fig. 1b
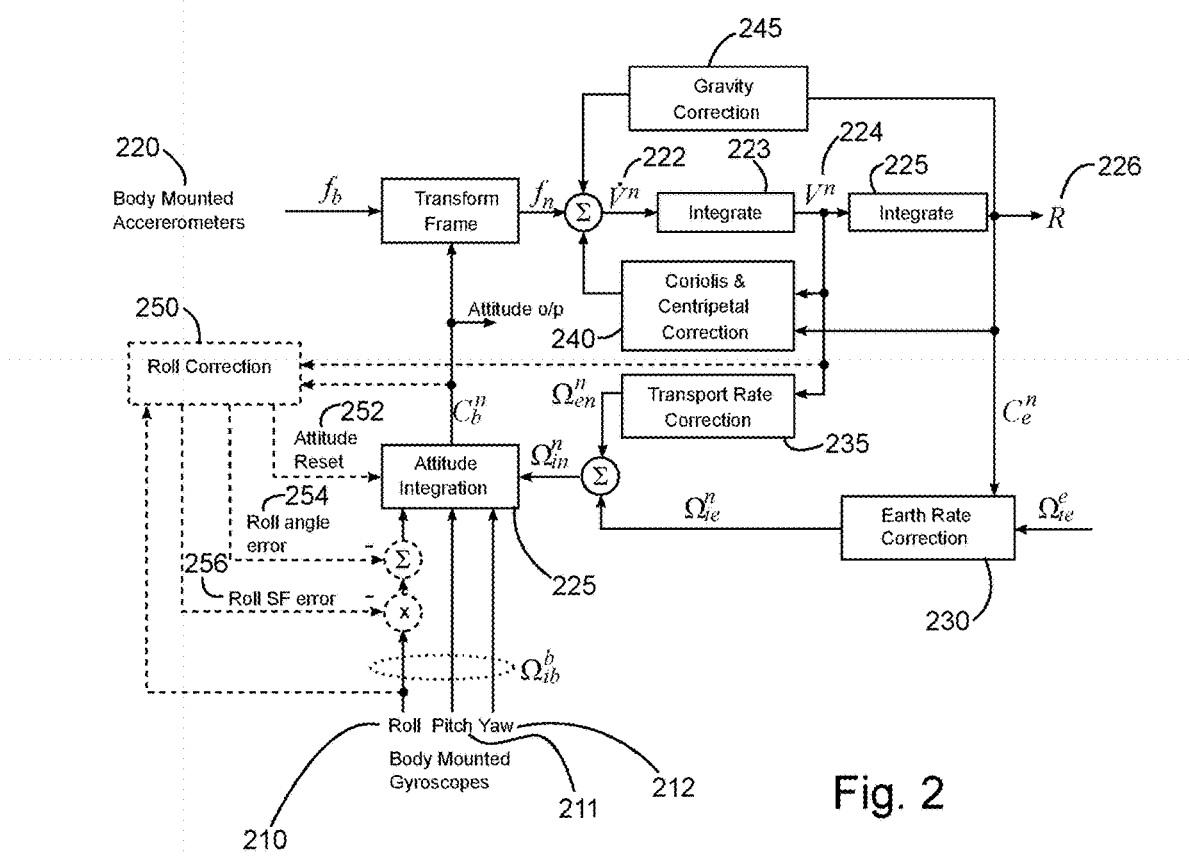
Fig. 2

INERTIAL NAVIGATION SYSTEM

CROSS REFERENCE TO RELATED APPLICATIONS

This is a US National Stage of Application No. PCT/GB2015/050439, filed on Feb. 16, 2015, which claims the benefit of GB Application No. 1403426.8 filed Feb. 27, 2014, the disclosures of which are incorporated herein by reference.

TECHNICAL FIELD

This disclosure relates to inertial navigation systems, in particular those used for projectiles e.g. guided rockets. Inertial navigation systems can be used on guided projectiles to provide position information which can in turn be used to correct the projectile's course to keep it on target.

BACKGROUND

Navigation systems can use a variety of different sensors to detect changes to the motion and orientation of an object. For example accelerometers, gyros and magnetometers are often used. Accelerometers detect applied force, gyros detect rotation rates and magnetometers detect the Earth's magnetic field and so can be used to determine absolute orientation.

Inertial navigation systems, based on accelerometers and gyroscopes, can be used either on their own or together with other navigation systems such as GPS. Navigation/guidance of rockets and other munitions is often based on the use of micro-electro-mechanical (MEMS) sensors due to their small size and low-cost. The accuracy of these sensors is relatively poor and not sufficient to meet typical navigation requirements unless external sensors are used to estimate and correct the inertial sensor errors. Using additional aiding sensors in this way is the basis of what is known as 'integrated navigation'.

Integrated navigation is usually based on an algorithmic technique known as Kalman Filtering, a process which blends data from the inertial sensors and the external sensors in an optimal way. For this technique to operate robustly, navigation errors must be maintained within certain limits at all times else the linearity assumptions on which the Kalman filter is founded will not be valid and the integrated navigation solution may become grossly inaccurate. It is desirable to avoid this situation by constraining navigation error growth during projectile flight.

When considering navigation Kalman filtering for applications involving rockets, missiles and other rotating platforms, initialising and maintaining an accurate roll (bank) angle presents the biggest challenge. An analysis of the problems associated with the use of inertial guidance technology in such applications is provided by J. S. Bird in "Inertial Sensor Performance Requirements for a Long Range Artillery Rocket" (DTIC ADA279936), with the conclusion that the roll gyro scale factor accuracy is critical and needs to be less than 5 parts-per-million (ppm).

Unfortunately, inexpensive low grade MEMS gyroscopes have a scale factor error of several thousand ppm. Using a gyroscope with a scale factor accuracy of less than 5 ppm would not be practical in terms of cost. Therefore there is a need for a system that can achieve the desired positional accuracy using inexpensive sensors with much lower scale factor accuracy.

The errors in gyroscope sensors are broadly divided into bias errors and scale factor errors. Although these and other errors are measured and removed as part of a factory calibration process, there will always be residual errors present when the sensors are actually used. These arise for a variety of reasons such as temperature and humidity changes, as well as other physical stresses affecting the unit. In general these errors may be different each time the unit is switched on.

As discussed in the above-referenced paper by J. S. Bird, in strapdown inertial navigation systems (i.e. those in which the inertial sensors are fixed to the body of the airframe as opposed to those in which the sensors are mounted on a gimballed platform that is free to rotate and so remain level at all times), one of the biggest problems comes from high roll rates. Typically roll rates for ballistic projectiles may be of the order of 10-20 full rotations per second, i.e. rotation rates of the order of a few thousand degrees per second. Therefore with a typical roll rate scale factor error of 1000 ppm, the roll angle (bank angle) calculated from this gyro would accumulate an error of a few degrees per second. For a typical projectile range of 30 to 60 km and a typical flight time of 1 to 2 minutes, this error quickly mounts up to be unacceptable.

Gyro bias error can readily be compensated immediately prior to use by averaging a series of readings while the gyro is known to be in a non-rotating state, e.g. prior to launch in the case of a projectile such as a rocket or missile. However, the scale factor error is rate-dependent and may not be measured and corrected whilst stationary. This suggests the need for a scale factor error correction process which operates in-flight, in a wholly self-contained fashion. This disclosure details such a process.

Alternative techniques which have been used in attempts to maintain roll accuracy include the use of non-inertial sensor aiding such as magnetometer, light sensor, GPS and/or thermopiles. These approaches add complexity and cost and introduce additional performance constraints. See for example "Attitude Determination with Magnetometers for un-Launched Munitions", M. J. Wilson, DTIC ADA425992; and "On the Viability of Magnetometer-Based Projectile Orientation Measurements", T. E. Harkins, DTIC ADA474475.

"Position Estimation for Projectiles Using Low-cost Sensors and Flight Dynamics" by L. D. Fairfax and F. E. Fresconi (DTIC ADA560811) describes another solution to this problem for gun-launched mortars which relies upon a multi-state Extended Kalman Filter to estimate position and velocity, but roll angle is determined via additional attitude aiding. This technique is applied to an application with a more benign roll rate profile than a typical artillery rocket.

U.S. Pat. No. 8,047,070 describes a process for estimating the roll angle of a gun-launched projectile. U.S. Pat. No. 8,047,070 uses body angular rate data as its measurements, as opposed to derived Euler angles. It also does not estimate or correct the roll rate scale factor error and it does not operate to preserve elevation and heading accuracy.

SUMMARY

According to this disclosure, there is provided an inertial measurement system for a longitudinal projectile comprising: a first, roll gyro to be oriented substantially parallel to the longitudinal axis of the projectile; a second gyro and a third gyro with axes arranged with respect to the roll gyro such that they define a three dimensional coordinate system; a controller, arranged to: compute a current projectile attitude from the outputs of the first, second and third gyros, the computed attitude comprising a roll angle, a pitch angle and a yaw angle; compare the computed pitch and yaw angles with expected values for the pitch and yaw angles; calculate a roll angle error and a roll scale factor error based on the difference between the computed pitch and yaw angles and the expected pitch and yaw angles; and apply the calculated roll angle error and roll scale factor error to the output of the roll gyro.

In some preferred examples the first, second and third gyros are substantially orthogonal to one another. This simplifies the calculations and is the case for most off-the-shelf IMUs.

According to this disclosure, there is provided an inertial measurement system for a longitudinal projectile comprising: a roll gyro to be oriented substantially parallel to the longitudinal axis of the projectile; a pitch gyro and a yaw gyro with axes substantially orthogonal to the roll gyro and orthogonal to each other; a controller, arranged to: compute a current projectile attitude from the outputs of the roll, pitch and yaw gyros, the computed attitude comprising a roll angle, a pitch angle and a yaw angle; compare the computed pitch and yaw angles with expected values for the pitch and yaw angles; calculate a roll angle error and a roll scale factor error based on the difference between the computed pitch and yaw angles and the expected pitch and yaw angles; and apply the calculated roll angle error and roll scale factor error to the output of the roll gyro.

Calculating both roll angle error and roll scale factor error as corrections in the inertial measurement system allows much better control and correction of the calculated roll angle from the roll gyroscope even at high roll rates (e.g. 10-20 rotations per second). This correction system compensates for the large errors that can arise in inexpensive gyroscopes and therefore allows an accurate navigational system to be built with inexpensive components. No additional attitude sensors such as magnetometers are required, again reducing the cost and complexity of the system.

Preferably the roll gyro is a MEMS (Micro Electro Mechanical System) gyro. All three gyros may be MEMS gyros. In some examples, the roll gyros may be a MEMS gyro with a rate scale factor error of greater than 100 parts per million. In some examples, the rate scale factor error may be greater than 1000 parts per million. As the scale factor error can be corrected by the feedback system, a high scale factor error can be tolerated. Thus lower quality, less expensive components can be used, reducing the cost of the system while maintaining excellent accuracy.

In some examples, the expected values for pitch and yaw angles as a function of time may correspond to those expected from planar ballistic flight. Planar ballistic flight refers to the trajectory that results when the only significant forces acting on the airframe are gravity and aerodynamic drag acting in the longitudinal axis. In general, there will always be other forces present but in many applications these will either be small or will have a neutral deflection effect due to the rolling motion of the airframe. The resulting trajectory will therefore be substantially in one plane and during such flight the heading angle (yaw angle) is not expected to change for the duration of that flight. The elevation angle (pitch angle) is expected to decrease at a known rate throughout the flight as a longitudinal projectile (which typically has fins for stability) tends to orientate itself at a tangent to its trajectory. Note that this flight may be one phase of a more complex flight plan, with subsequent phases involving corrective maneuvers that deviate from the planar trajectory.

Using planar ballistic heading and elevation angles for the expected yaw and pitch angles means that the system treats any deviation in calculated yaw and pitch angles from the expected ballistic trajectory to have resulted from errors in the roll angle calculation.

Preferably the roll angle error is calculated as the angle whose tangent is the ratio of the rate of change of the calculated yaw angle to the rate of change of the calculated pitch angle. In some examples, the ratio may include a negative sign due to the geometrical definitions. For example, the roll angle error may be calculated as the angle whose tangent is the ratio of the rate of change of the calculated yaw angle to the negative of the rate of change of the calculated pitch angle.

In the case of projectiles that do not follow a purely planar trajectory, but still follow a predictable trajectory, the predicted yaw and pitch angles throughout the flight can still be used as reference values. One such example would be a spin-stabilised artillery shell which spins at very high rate (greater than 100 revolutions per second), which results in many forces which act to deflect the course of the shell. Any deviation of yaw and pitch angles from the reference values can be taken to have resulted from errors in the roll angle calculation. In such cases, pre-computed flight trajectory information is loaded into the onboard navigation system. This may be in the form of a flight path aiding table (FPAT) or similar. For many projectiles/munitions, the likely flight trajectory from launch point to target is established during a pre-launch mission planning process. This process usually yields tabular data describing the expected position, velocity and attitude of the projectile as a function of flight time (the FPAT). This data may be transferred to the projectile and used during flight for various purposes related to navigation/guidance. The expected yaw and pitch values can be continuously looked up during the flight as required. Therefore the expected values for pitch and yaw angles as a function of time may be taken from pre-computed flight trajectory information.

Although the calculated roll angle error and roll scale factor could simply be applied directly as full corrections, it is generally found better to apply a gain factor or weighting coefficient to reduce these corrections, thereby avoiding overcompensation and facilitating rapid convergence on stability. Therefore preferably the roll angle error is multiplied by a roll angle error gain factor before being applied to the output of the roll gyro. Likewise, preferably the roll scale factor error is multiplied by a roll scale factor error gain factor before being applied to the output of the roll gyro.

The gain factors may be time varying if required. These may be pre-calculated analytically, using techniques based on control theory, or calculated dynamically, using a Kalman filter or other linear estimator. If not computed dynamically, time-varying gains may be implemented via use of a pre-computed look-up-table. For example the look-up-table may indicate gain K1 from time t1 to t2, gain K2 from time t2 to t3, etc. However, the system works well with simple fixed values. Therefore preferably the gain factor(s) are fixed values.

In an alternative system, the roll scale factor error gain may be proportional to the reciprocal of the instantaneous roll rate as this reflects the relationship between roll angle error, roll scale factor error and roll rate.

The system will measure roll angle data from the point of launch. However, during the initial period of flight, the flight model (e.g. a purely ballistic flight model) may not hold well, e.g. during a period in which a rocket motor or thrusters are firing. Therefore in some preferred examples the controller is arranged such that a period of time after launch it performs an attitude reset function, said attitude reset function comprising: setting the current projectile yaw equal to a corrected yaw value; and setting the current projectile pitch equal to a corrected pitch value. This attitude reset function ignores any pitch and yaw effects that may have been introduced during the initial period that does not follow the model and which could adversely affect roll correction calculations. After this stage the projectile follows the predictable path of the model and so roll correction calculations made after the attitude reset will be more accurate.

In preferred examples, the inertial measurement system further comprises: body mounted accelerometers for measuring an acceleration vector; and a velocity calculation unit that calculates a velocity vector from the acceleration vector; and the corrected yaw value is equal to a current track angle of the velocity vector and the corrected pitch value is equal to a current climb angle of the velocity vector. The track angle of the projectile is the direction that the projectile is moving in the navigation frame of reference (i.e. essentially the direction of the path that it traces along the surface of the earth). The climb angle is similarly the angle that its trajectory currently makes with the horizontal. As most longitudinal projectiles normally orientate themselves at a tangent to their flight trajectory, the pitch and yaw components of the attitude of the projectile (i.e. the orientation of its longitudinal axis) can be equated to the climb angle and track angle respectively.

The attitude reset preferably takes place prior to performing any calculation of roll angle error or scale factor error calculations. Roll rate and roll angle data are still accumulated during this phase, but the error correction calculations are preferably only put in place after the attitude reset when the flight path is in its most predictable phase.

In some preferred examples, the period of time before attitude reset is a time at which the measured roll rate decreases below a threshold roll rate. The roll rate increases rapidly during the initial phase of flight after launch, e.g. due to firing from a rifled gun barrel. After launch, the roll rate starts to decrease and flight stability increases. Therefore waiting for a predetermined roll rate to be achieved means that a certain level of stability can be assumed which in turn increases the accuracy of the roll error correction calculations.

In alternative examples, the period of time is a set time after launch. The flight can normally be assumed to have achieved a required level of stability after a certain time and therefore, this provides a simple way to identify an appropriate time to perform the attitude reset. In some examples, a combination of roll rate and time from launch may be used, e.g. the attitude reset may be triggered at the first to occur of a time from launch or a predetermined roll rate.

According to another aspect of this disclosure, there is provided a method of correcting roll angle in an inertial measurement system for a longitudinal projectile, comprising: computing a current projectile attitude comprising a roll angle, a pitch angle and a yaw angle; comparing the computed pitch angle and computed yaw angle with an expected pitch angle and an expected yaw angle; calculating a roll angle error and a roll scale factor error based on the difference between the computed pitch and yaw angles and the expected pitch and yaw angles; and applying the calculated roll angle error and roll scale factor error to the output of a roll gyro.

All of the preferred features described above in relation to the system are equally applicable to this corresponding method. In preferred examples, the method and system are particularly applicable to high roll rate projectiles, i.e. projectiles intended to be imparted with a high roll rate during flight, e.g. greater than 5, greater than 10 or greater than 15 revolutions per second.

BRIEF DESCRIPTION OF DRAWINGS

One or more non-limiting examples will now be described, by way of example only, and with reference to the accompanying figures in which:

FIG. 1a shows a projectile in flight;
FIG. 1b illustrates the attitude of the projectile;
FIG. 2 shows an inertial navigation system.

FIG. 1a illustrates a rocket 100 in flight. Its trajectory 110 is shown in broken line. The rocket 100 has a nose 101, tail 102 with fins 103. Fins 103 may be static or they may be movable so as to provide directional control so as to alter the flight path of the rocket 100.

Figure 3:
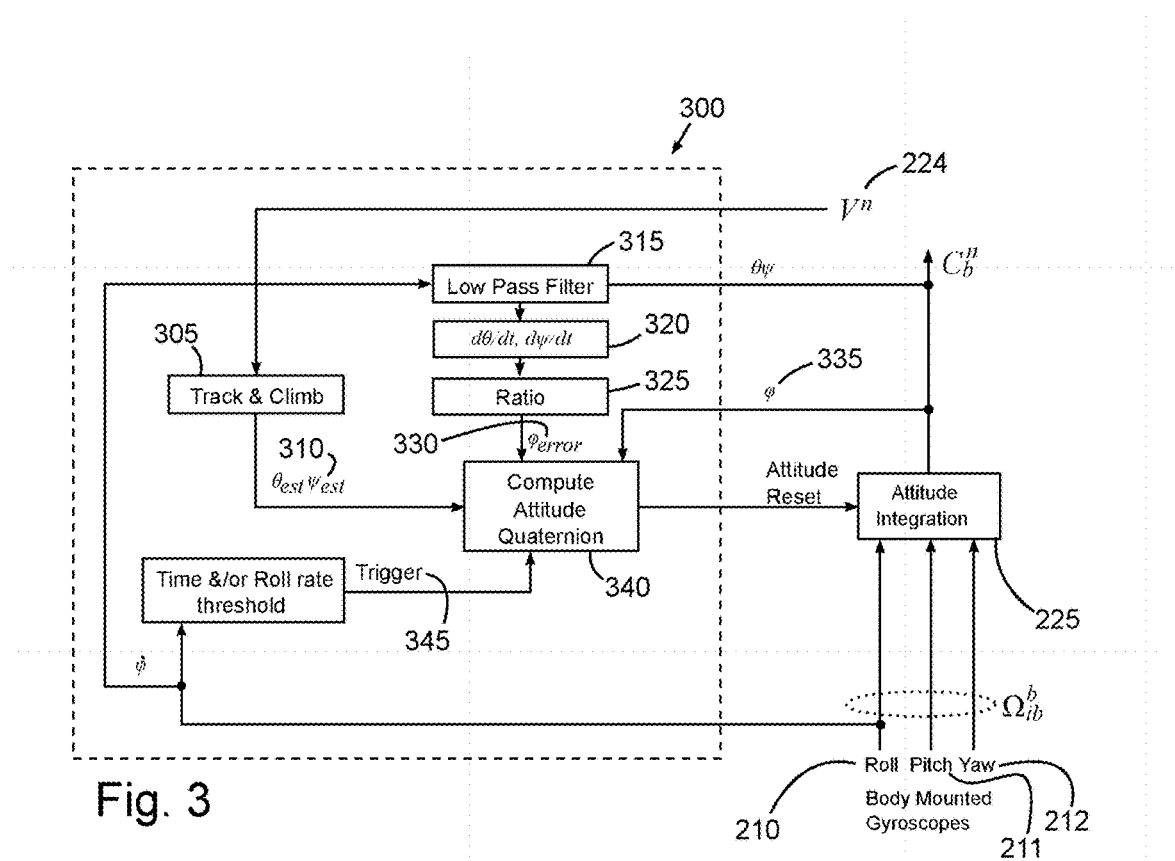
FIG. 3 shows an attitude reset function.

In inertial navigation terminology, the orientation of a body/platform is described in terms of the three Euler angles 'heading, 'elevation' and 'bank'. The equivalent terms yaw', 'pitch' and 'roll' are also in use. The body orientation is generally referred to using the term 'attitude'. Although strictly speaking the term 'attitude' refers only to the elevation and bank angles, in this document, the more general definition is used. Therefore in this document, the term 'attitude' refers to all three of heading, elevation and bank (or equivalently yaw, pitch and roll).

A 'quaternion' is a 4-element hyper-complex number used in inertial navigation as a convenient method of maintaining and propagating heading/attitude angles. Use of quaternions avoids the numeric singularities that can occur when Euler angles are manipulated directly. The use of quaternions in navigation systems is well known and is not described further here.

In FIG. 1b the attitude 125 of the rocket 100 is shown with respect to the axes 120 of the navigation frame of reference. The projection of the attitude 125 onto the horizontal plane is shown by dotted line 126. The heading or yaw angle of the rocket is shown by the angle 121, the elevation or pitch angle of the rocket is shown by the angle 122 and the bank or roll angle of the rocket about its longitudinal axis is indicated by arrow 123. The rocket 100 is rotating anti-clockwise when viewed from behind as shown.

FIG. 2 illustrates how the roll correction system of the examples described here fits into a standard inertial navigation system.

This example is described below in terms of its use in a surface-to-surface rocket application. However, the technique may be applied to any projectile/munition which travels on a predictable trajectory once the initial launch event/rocket motor burn phase is complete, and prior to any guidance actions being initiated. This period of flight may be referred to as the 'ballistic phase'. During ballistic flight, the platform will travel on a heading (yaw) which is either fixed/constant, or a heading which changes predictably over time. Similarly, the platform will exhibit an elevation (pitch) angle profile which develops predictably during flight. According to the preferred examples described here, any deviation from these expected profiles can be used to compute and correct the prevailing roll angle error, which in turn allows gyro scale factor error to be inferred. Scale factor corrections can then be applied at source to prevent further roll angle errors developing.

The following text describes a two-step process involving firstly an 'attitude reset', followed by a continuous process of roll angle error determination and correction. Again, this approach is focussed on the surface rocket application, where this specific sequence of events is appropriate. In other applications the attitude reset process may not be required, or it may be replaced by some equivalent but different process. For example, in applications involving guided artillery shells there is no opportunity for initialising the inertial navigation process on the ground. Instead the process must be initiated in-flight. A common approach is to initialise using data in a flight-path-aiding table (FPAT), and this circumvents the need for an attitude reset process.

The Roll Control process is indicated in FIG. 2 by the dashed lines and boxes with dashed borders. The conventional strapdown inertial data flow is indicated by solid lines and boxes with solid borders. The process is particularly suited to operate as part of the navigation function of a MEMS IMU based system used to guide a surface launched rocket. The normal sequence of events for this example is:

Initialise and align the navigation system on the ground prior to launch

Launch the rocket, at which point high roll rotation rates are experienced (e.g. 10 Hz to 20 Hz)

During this flight phase Bank (roll) angle error rapidly increases (e.g. >10°/s)

As the flight progresses, the roll rate may reduce and an orderly flight trajectory develops At this point an Attitude Reset function restores the attitude quaternion accuracy as described below.

A Roll Control function then operates to maintain Bank (roll) angle accuracy This process is intended to restrict the inertial attitude error growth during the unguided flight phase and prior to any control action, to allow GPS-aided navigation to operate.

As shown in FIG. 2, the raw inputs of the inertial navigation system 200 are the roll, pitch and yaw rates from the body mounted gyroscopes indicated at 210, 211, 212 respectively, and the specific force vector $f_b$ from the body mounted accelerometers indicated at 220.

In a standard navigation system (ignoring for the moment the additional roll control functions of this example), the gyroscope outputs 210, 211, 212 are integrated by the attitude integration function 225. The attitude integration function also takes into account other corrections such as the Earth Rate Correction 230, Transport Rate Correction 235, Coriolis & Centripetal Correction 240 and Gravity Correction 245. Each of these corrections are based on the position and velocity data derived from the accelerometers 220. The acceleration vector $\dot{v}_n$ 222 is integrated by first integration module 223 to produce velocity vector $v_n$ 224 which is integrated by second integration module 225 to produce position vector R 226.

The Earth Rate Correction 230, Transport Rate Correction 235, Coriolis & Centripetal Correction 240 and Gravity Correction 245 and the associated transformations between reference frames are all well-known and understood and will therefore not be described further here. However, to aid understanding, the symbols in FIGS. 2, 3 and 4 have the following meanings:

$f_b$ Specific force in the body reference frame
$f_n$ Specific force in the navigation reference frame
$\dot{v}_n$ n Acceleration in the navigation frame of reference
$v_n$ Velocity in the navigation frame of reference
$C_b^n$ Transformation matrix—body to navigation reference frames
$\Omega_{en}^n$ Navigation frame rotation with respect to the Earth frame in the navigation frame of reference
$C_e^n$ Transformation Matrix—Earth to navigation reference frames
$\Omega_{ib}^b$ Body rotation rate in the body frame of reference
$\Omega_{in}^n$ Navigation frame rotation rate in the navigation frame of reference
$\Omega_{ie}^n$ Earth rotation rate in the navigation frame of reference
$\Omega_{ie}^e$ Earth rotation rate in the Earth frame of reference
θ Inertially derived Elevation (pitch) angle
φ Inertially derived Bank (roll) angle
ψ Inertially derived Heading (yaw) angle
$\phi_{error}$ Bank (roll) angle error estimate
$\theta_{est}$ Elevation angle estimate, based on Climb angle
$\psi_{est}$ Heading angle estimate, based on Track angle
$\dot{\phi}$ Inertially measured roll rate $\frac{\partial \theta}{\partial t}$ Inertially derived Elevation (pitch) angle rate $\frac{\partial \psi}{\partial t}$ Inertially derived Heading (yaw) angle rate The roll correction process of this example is shown at 250. It receives inputs from the roll gyroscope 210 as well as the current velocity $v_n$ and the current calculated attitude $C_b^n$. The roll correction process 250 outputs an attitude reset output 252, a roll angle error output 254 and a roll scale factor error output 256.

The attitude reset function 300 of the roll control process 250 will be described first with reference to FIG. 3.

The Attitude Reset function 300 operates as a single event, triggered by a pre-defined condition, such as time from launch or a roll rate threshold as described further below.

When triggered the function re-computes the attitude quaternion based on the following calculations:

The computed velocity vector $v_n$ 224 is fed into the Track & Climb angle module 305. In Track & Climb angle module 305, the heading (yaw) component is output as an estimate of the yaw angle $\psi_{est}$ and the elevation (pitch) component is output as an estimate of the pitch angle $\theta_{est}$ as indicated at 310.

Bank (roll angle) is derived as a correction to the existing Bank (roll) estimate, the correction being the ratio between the Heading (yaw) rate and the Elevation (pitch) rate as calculated from the attitude integration module 225. In other words, the Bank angle error is the angle having the ratio of Heading (yaw) rate to Elevation (pitch) Rate as its trigonometric tangent. This calculation is based on the assumption that the rocket trajectory is purely planar i.e. it maintains the same fixed heading throughout the flight. The elevation angle in such flight is also expected to decrease at a constant, predictable rate. This calculation is based on the assumption that any deviation in Heading (yaw) angle must have arisen through errors in the Bank (roll) angle calculation. This technique may however be extended to applications involving non-planar trajectories (e.g. spinning artillery shells) using prior knowledge of the expected heading profile. In such cases, a similar calculation can be made using the deviation of the calculated Heading (yaw) angle compared with the expected/predicted Heading (yaw) angle and assuming that any such deviations have arisen through errors in the Bank (roll) calculation.

The Heading (yaw) and Elevation (pitch) rates are continuously calculated as the time derivative of low-pass filtered forms of the Heading (yaw) and Elevation (pitch) angles from the attitude integration module 225. The low pass filter gain is varied according to the roll rate, to accommodate the effect of roll rate on the characteristics of unwanted modulations in the heading and elevation angles. The frequency and magnitude of the unwanted modulations are related to roll rate, therefore the low pass filter performs better if adjusted by the roll rate.

Referring to FIG. 3, the Heading (yaw, psi) and Elevation (pitch, theta) angles are extracted from the attitude integration module 225 and fed into low pass filter 315 which filters out unwanted high frequency components. Time derivatives of Elevation (pitch) angle, $$\frac{\partial \theta}{\partial t}$$

and Heading (yaw) angle, $$\frac{\partial \psi}{\partial t}$$

are calculated by time-derivative module 320 and the ratio of these time derivatives is calculated in Ratio module 325. The ratio is output as the roll angle error ($\phi_{error}$) 330.

Attitude quaternion computation module 340 receives the current calculated roll angle phi 335 from the attitude integration module 225 along with the roll angle error $\phi_{error}$ 330 and the new estimated values of pitch and yaw ($\theta_{est}$ and $\psi_{est}$) 310 as well as the trigger command 345. Attitude quaternion computation module 340 then outputs the new attitude reset values ($\theta_{est}$, $\psi_{est}$ and $\phi_{error}$) to the attitude integration module 225 to reset the current attitude.

As mentioned above, the trigger for the attitude correction function 300 can be based on either or both of a time threshold or a roll rate threshold. A time threshold can be used to trigger the attitude correction function a predetermined time after launch. For example, the predetermined time may be a time at which stable, ballistic flight is expected to have been achieved. As a purely illustrative example, this may be a few seconds after launch once the rocket motor has ceased. Another possibility is to trigger the attitude reset function 300 when the roll rate drops below a predetermined threshold. The roll rate will typically be highest shortly after launch (e.g. due to firing with a rifled gun barrel) and will then decrease throughout the remainder of the flight. Stable flight may therefore readily be associated with a roll rate lower than a predetermined threshold value.

Combinations of time and roll rate may also be used as a trigger for the attitude reset function 300. For example, the attitude reset may be triggered at the earliest to occur of the two thresholds, i.e. the earliest of a time threshold and a roll rate threshold. Alternatively, the attitude reset may be triggered a predetermined time after the predetermined roll rate has been achieved. It will be appreciated that other triggers for the attitude reset function may also be contemplated.

After the attitude reset has taken place, the roll control process 400 is also initiated. This process 400 continuously monitors deviations to the Heading (yaw) and Elevation (pitch) of the projectile 100 and uses these to adjust the roll angle error and roll scale factor values and thereby continuously corrects the computed roll angle.

Figure 4:
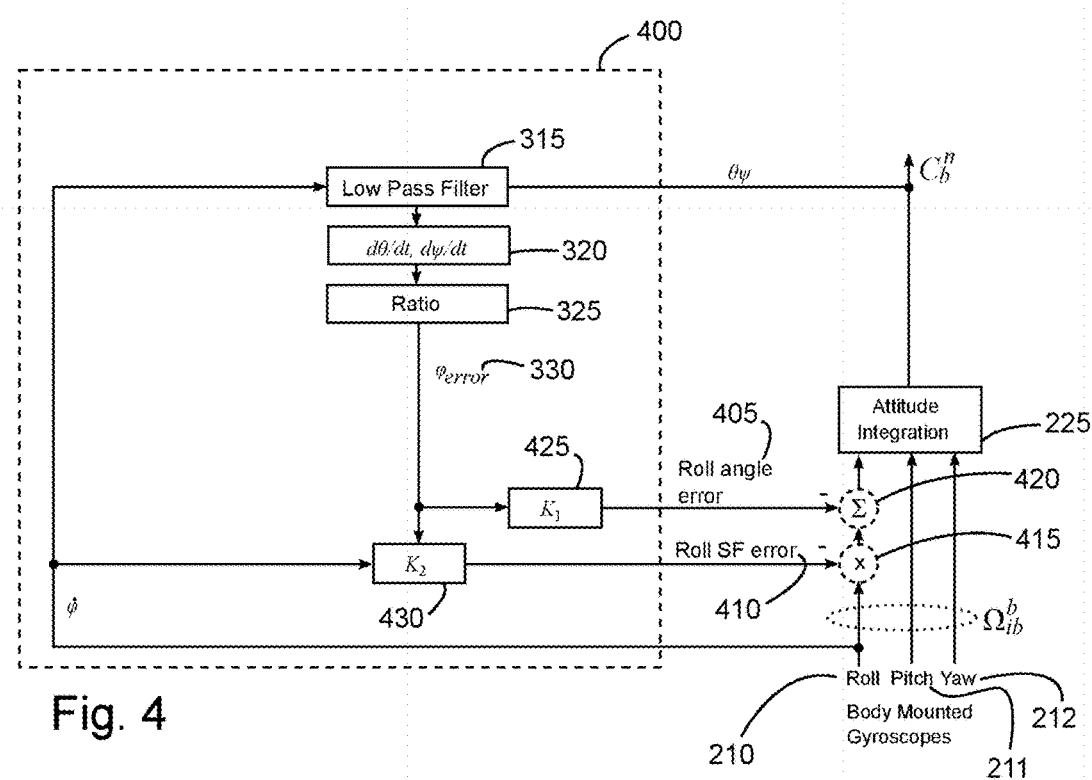
FIG. 4 shows a roll control process.

Following the Attitude Reset, and up to the point that GPS aiding allows a different navigation regime to operate, the Roll Control function 400 maintains Bank (roll) angle accuracy using a closed-loop control process as illustrated in FIG. 4.

A low-pass filter 315 is applied to the Heading (yaw) and Elevation (pitch) angles, and the ratio of their time derivatives (which may be calculated as an angle as described above in relation to the attitude reset function) is used to compute corrections to both roll angle and roll rate scale factor.

The roll angle error $\phi_{error}$ 330 is calculated in the same manner as described above in relation to the attitude reset function 300. It will be appreciated that the roll control process 400 may be implemented separately from the attitude reset function 300. Indeed, in some examples, the attitude reset function may not be used or required. However, where both the attitude reset function 400 and the roll control process 300 are both implemented as described here, the low pass filter 315, time derivative module 320 and ratio module 325 may be shared by the two processes 300, 400.

The calculated roll angle error $\phi_{error}$ 330 is used to calculate both the roll angle error 405 and the roll scale factor error 410. The output of roll gyroscope 210 is first multiplied by the roll scale factor error 410 as indicated at 415 and then the roll angle error 405 is added as indicated at 420.

The roll angle error 405 and the roll scale factor error 410 are preferably produced from the calculated roll angle error $\phi_{error}$ 330 by multiplying the calculated roll angle error $\phi_{error}$ 330 by a gain or weighting factor, K1 425 for the roll angle error 405 and K2 430 for the scale factor error 410.

Fixed gains (terms K1 and K2) have been found to provide sufficient stability, although a variable gain or Kalman filter implementation may also be employed in other examples. In yet further examples, the scale factor correction may also be factored by the reciprocal of the instantaneous roll rate.

The roll correction process described above can be readily adapted to other types of projectiles. For example, projectiles which are not ground initialised (e.g. gun-launched) will not have self-derived velocity parameters available to compute the elevation and heading components of the attitude reset, in which case these may be substituted with either pre-defined or GPS measured velocity data.

If the physical characteristics of the projectile result in non-planar trajectories where $$\tan^{-1}\left(\frac{\frac{d\psi}{dt}}{\frac{-d\theta}{dt}}\right)$$

is non zero, a pre-defined offset may be used as an expected value to derive the Bank angle error correction. For example, in some examples it may be necessary to implement an offset that varies according to elapsed flight time.

Note that the negative sign in the denominator of the above formula arises from the geometry and the direction in which angles are considered positive. An alternative, but equally useful definition would yield no negative sign.

As the roll correction process 400 is a closed loop, feedback system with the correction being derived from and fed back to the roll gyroscope output, providing the gain factors K1 and K2 are set appropriately, the system is able to converge on a stable state with a highly accurate attitude output, while still allowing inexpensive components to be used for the gyroscopes.

The above examples make use of closed-loop control, i.e. the controller maintains a system output at some desired level by monitoring the difference between the actual output and the desired output. The difference between the two (the error') is continuously computed and some proportion of this is used in setting the level of control action required to drive the error towards zero. The proportion of the error that is used (the 'loop gain') is determined during system design using techniques based on control theory. Many control regimes exist, and they variously involve fixed or time-varying gain terms.

In the above examples, the desired output of the closed-loop control system is a heading angle equal to the predicted heading angle, e.g. a rate of change of heading angle equal to zero in the case of an expected planar flight path.

The invention claimed is:

1. An inertial measurement system for a longitudinal projectile comprising:
    a first, roll gyro to be oriented substantially parallel to the longitudinal axis of the projectile;
    a second gyro and a third gyro with axes arranged with respect to the roll gyro such that they define a three dimensional coordinate system;
    a controller, arranged to:
        compute a current projectile attitude from the outputs of the first, second and third gyros, the computed attitude comprising a roll angle, a pitch angle and a yaw angle;
        compare the computed pitch and yaw angles with expected values for the pitch and yaw angles;
        calculate a roll angle error and a roll scale factor error based on the difference between the computed pitch and yaw angles and the expected pitch and yaw angles; and
        apply the calculated roll angle error and roll scale factor error to the output of the roll gyro.

2. An inertial measurement system as claimed in claim 1, wherein the roll gyro is a MEMS gyro.

3. An inertial measurement system as claimed in claim 1, wherein the expected values for pitch and yaw angles as a function of flight time correspond to those expected from planar ballistic flight.

4. An inertial measurement system as claimed in claim 3, wherein the roll angle error is calculated as the angle whose tangent is the ratio of the rate of change of the calculated yaw angle to the rate of change of the calculated pitch angle.

5. An inertial measurement system as claimed in claim 1, wherein the expected values for pitch and yaw angles as a function of flight time are taken from a pre-computed flight trajectory which may be non-planar.

6. An inertial measurement system as claimed in claim 1 wherein the roll angle error is multiplied by a roll angle error gain factor before being applied to the output of the roll gyro.

7. An inertial measurement system as claimed in claim 1, wherein the roll scale factor error is multiplied by a roll scale factor error gain factor before being applied to the output of the roll gyro.

8. An inertial measurement system as claimed in claim 6, wherein the gain factor is a fixed value.

9. An inertial measurement system as claimed in claim 7, wherein the roll scale factor error gain is proportional to the reciprocal of the instantaneous roll rate.

10. An inertial measurement system as claimed in claim 1, wherein the roll angle error and roll scale factor error are only applied prior to any guidance action being initiated.

11. An inertial measurement system as claimed in claim 1, wherein the controller is arranged such that a period of time after launch it performs an attitude reset function, said attitude reset function comprising:
    setting the current projectile yaw equal to a corrected yaw value; and
    setting the current projectile pitch equal to a corrected pitch value.

12. An inertial measurement system as claimed in claim 11, further comprising:
    body mounted accelerometers for measuring an acceleration vector; and
    a velocity calculation unit that calculates a velocity vector from the acceleration vector; and
    wherein the corrected yaw value is equal to a current track angle of the velocity vector and the corrected pitch value is equal to a current climb angle of the velocity vector.

13. An inertial measurement system as claimed in claim 11, wherein the period of time is a time at which the measured roll rate decreases below a threshold roll rate.

14. An inertial measurement system as claimed in claim 11, wherein the period of time is a set time after launch.

15. A method of correcting roll angle in an inertial measurement system for a longitudinal projectile, comprising:
    computing a current projectile attitude comprising a roll angle, a pitch angle and a yaw angle;
    comparing the computed pitch angle and computed yaw angle with an expected pitch angle and an expected yaw angle;
    calculating a roll angle error and a roll scale factor error based on the difference between the computed pitch and yaw angles and the expected pitch and yaw angles; and
    applying the calculated roll angle error and roll scale factor error to the output of a roll gyro.

* * * * *